US006864909B1

(12) United States Patent
Horowitz (10) Patent No.: US 6,864,909 B1
(45) Date of Patent: Mar. 8, 2005

(54) SYSTEM AND METHOD FOR STATIC PERCEPTUAL CODING OF MACROBLOCKS IN A VIDEO FRAME

(75) Inventor: Michael Horowitz, Austin, TX (US)

(73) Assignee: Polycom, Inc., Milpitas, CA (US)

(*) Notice: Subject to any disclaimer, the term of this patent is extended or adjusted under 35 U.S.C. 154(b) by 272 days.

(21) Appl. No.: 10/218,256

(22) Filed: Aug. 12, 2002

Related U.S. Application Data (60) Provisional application No. 60/311,375, filed on Aug. 10, 2001, and provisional application No. 60/311,405, filed on Aug. 10, 2001.

(51) Int. Cl.[7] ................................................. H04N 7/14
(52) U.S. Cl. ................................. 348/14.12; 348/14.13
(58) Field of Search ........................... 348/14.01–14.09, 348/14.1, 14.11–14.13, 14.16; 370/240.24; H04N 7/14

(56) References Cited

FOREIGN PATENT DOCUMENTS

JP      06-233292    *  8/1994  ............ H04N/7/14

* cited by examiner

*Primary Examiner*—Melur Ramakrishnaiah
(74) *Attorney, Agent, or Firm*—Wong, Cabello Lutsch, Rutherford & Brucculeri LLP (57) ABSTRACT

The present invention allows video images with improved subjective quality to be transmitted without a concomitant increase in a total number of bits transmitted per frame. Quantization parameters are applied to coefficients of macroblocks within a given video frame. A lower value of quantization parameter is applied near a central region of a video frame. This central region is referred to as a prime video region. Applying a lower quantization parameter to the prime video region has the effect of increasing the bit density within that area thereby improving the video quality. Outside of the prime video region, the bit density is progressively decreased on a macroblock-by-macroblock basis so as to have a zero or near-zero net-gain in bit density over the entire video frame.

26 Claims, 6 Drawing Sheets

FIG. 6

SYSTEM AND METHOD FOR STATIC PERCEPTUAL CODING OF MACROBLOCKS IN A VIDEO FRAME

CROSS-REFERENCE TO RELATED APPLICATIONS

This application claims benefit of U.S. Provisional Application No. 60/311,375 filed Aug. 10, 2001, entitled "Dynamic Perceptual Coding of Macroblocks in a Video Frame," and U.S. Provisional Application No. 60/311,405, entitled "Static Perceptual Coding of Macroblocks in a Video Frame," filed Aug. 10, 2001 which are hereby incorporated by reference in their entirety. This application additionally is related to copending utility application entitled "System and Method for Dynamic Perceptual Coding of Macroblocks in a Video Frame," filed Aug. 12, 2002.

BACKGROUND OF THE INVENTION

1. Field of the Invention

The present invention relates to video images, and more particularly to a system and method of enhancing video coding.

2. Description of the Background Art

Video images have become an increasingly important part of communications in general. The ability to nearly instantaneously transmit still images, and particularly, live moving images, has greatly enhanced global communications.

In particular, videoconferencing systems have become an increasingly important business communication tool. These systems facilitate meetings between persons or groups of persons situated remotely from each other, thus eliminating or substantially reducing the need for expensive and time-consuming business travel. Since videoconference participants are able to see facial expressions and gestures of remote participants, richer and more natural communication is engendered. In addition, videoconferencing allows sharing of visual information, such as photographs, charts, and figures, and may be integrated with personal computer applications to produce sophisticated multimedia presentations.

To provide cost-effective video communication, the bandwidth required to convey video must be limited. The typical bandwidth used for videoconferencing lies in the range of 128 to 1920 kilobits per second (Kbps). Problems associated with available videoconferencing systems as these systems attempt to cope with bandwidth limitations include slow frame rates, which result in a non-lifelike picture having an erratic, jerky motion; the use of small video frames or limited spatial resolution of a transmitted video frame; and a reduction in the signal-to-noise ratio of individual video frames. Conventionally, if one or more of these solutions is not employed, higher bandwidths are then required.

At 768 Kbps, digital videoconferencing, using state-of-the-art video encoding methods, produces a picture that may be likened to a scene from analog television. Typically, for most viewers, twenty-four frames per second (fps) are required to make video frames look fluid and give the impression that motion is continuous. As the frame rate is reduced below twenty-four fps, an erratic motion results. In addition, there is always a tradeoff between a video frame size required and available network capacity. Therefore, lower bandwidth requires a lower frame rate and/or reduced video frame size.

A standard video format used in videoconferencing, defined by resolution, is Common Intermediate Format (CIF). The primary CIF format is also known as Full CIF or FCIF. The International Telecommunications Union (ITU), based in Geneva, Switzerland (www.itu.ch), has established this communications standard. Additional standards with resolutions higher and lower than CIF have also been established. Resolution and bit rate requirements for various formats are shown in the table below. The bit rates (in megabits per second, Mbps) shown are for uncompressed color frames where 12 bits per pixel is assumed.

TABLE I

Resolution and bit-rates for various CIF formats

| CIF Format | Resolution (in pixels) | Bit Rate at 30 fps (Mbps) |
| --- | --- | --- |
| SQCIF (Sub Quarter CIF) | 128 × 96 | 4.4 |
| QCIF (Quarter CIF) | 176 × 144 | 9.1 |
| CIF (Full CIF, FCIF) | 352 × 288 | 36.5 |
| 4CIF (4 × CIF) | 704 × 576 | 146.0 |
| 16CIF (16 × CIF) | 1408 × 1152 | 583.9 |

Video compression is a way of encoding digital video to take up less storage space and reduce required transmission bandwidth. Certain compression/decompression (CODEC) schemes are frequently used to compress video frames to reduce the required transmission bit rates. Overall, CODEC hardware or software compresses digital video into a smaller binary format than required by the original (i.e., uncompressed) digital video format.

H.263 is a document which describes a common contemporary CODEC scheme, requiring a bandwidth from 64 to 1920 Kbps. H.263 is an ITU standard for compressing video, and is generically known as a lossy compression method. Lossy coding assumes that some information can be discarded, which results in a controlled degradation of the decoded signal. The lossy coding method is designed to gradually degrade as a progressively lower bit rate is available for transmission. Thus, the use of lossy compression methods results in a loss of some of the original image information during the compression stage and, hence, the lost original image information becomes unrecoverable. For example, a solid blue background in a video scene can be compressed significantly with little degradation in apparent quality. However, other frames containing sparse amounts of continuous or repeating image portions often cannot be compressed significantly without a noticeable loss in image quality.

Many video compression standards, including MPEG, MPEG-2, MPEG-4, H.261, and H.263 utilize a block-based Discrete Cosine Transform (DCT) operation on data blocks, 8×8 samples in size. A set of coefficients for each block is generated through the use of a two-dimensional DCT operation. Such coefficients relate to a spatial frequency content of the data block. Subsequently, the 64 DCT coefficients (one for each sample) in a block are uniformly quantized. For H.263, one quantizer step size is applied to every DCT coefficient in a data block and is part of the information that must be transmitted to a H.263 decoder. The quantization process is defined as a division of each DCT coefficient by the quantization step size followed by rounding to the nearest integer. An encoder applies variable uniform quantization to DCT coefficients to reduce the number of bits required to represent them. Compression may be performed on each of the pixels represented by a two-by-two array of blocks containing luminance samples and two blocks of chrominance samples. . This array of six blocks is commonly referred to as a macroblock. The four luminance and two chrominance data blocks in a macroblock combine to represent a 16×16 pixel array.

In an H.263 encoder, variable uniform quantization is applied by means of the quantization parameter that provides quantization step sizes that map the values of DCT coefficients to a smaller set of values called quantization indices. In the H.263 decoder, DCT coefficient recovery is performed, roughly speaking, by multiplying the recovered quantization indices by the inverse quantization step size. The decoder then calculates an inverse DCT using the recovered coefficients.

Although these and other compression methods have proven somewhat effective, there remains a need to improve perceived video quality over low bandwidth transmission channels. Therefore, there is a need for a system and method for static perceptual coding of macroblocks in a video frame.

SUMMARY OF THE INVENTION

The present system and method overcomes or substantially reduces prior problems associated with transmission of high quality video images. In general, the present system and method provide increased subjective video quality without increasing bandwidth required to carry the video.

An embodiment of the present invention is provided which allows higher quality video images to be transmitted without a concomitant increase in a total number of video data bits transmitted per frame or group of frames. To accomplish this, quantization parameters are applied to DCT coefficients of macroblocks within a given video frame in a special way. A lower value of quantization parameter is applied near a central region of a video frame. This central region is referred to as a prime video region since a viewer will, in general, concentrate attention on this prime video region. Applying a lower value quantization parameter to the prime video region has the effect of increasing the bit density and, subsequently, increasing the video quality within that area. Outside of the prime video region, the bit density per macroblock is decreased so as to have a zero or near-zero net-gain in bit density over the entire video frame.

In an alternative embodiment of the present invention, a particular frame may be transmitted with an overall increase in the number of bits. However, in this embodiment, subsequent frames (or preceding frames) will have a decreased number of bits, thus, producing an overall zero or near-zero-sum net gain over a span of numerous video frames. By varying the number of bits between frames while maintaining an overall near zero-sum net gain, it is possible to transmit a video sequence with an increase in perceived quality while still maintaining a given bandwidth usage. The apparent increase in quality results from the application of quantization parameters having lower values within the prime video region and higher values outside the prime video region as described supra.

DETAILED DESCRIPTION OF THE INVENTION

Figure 1:
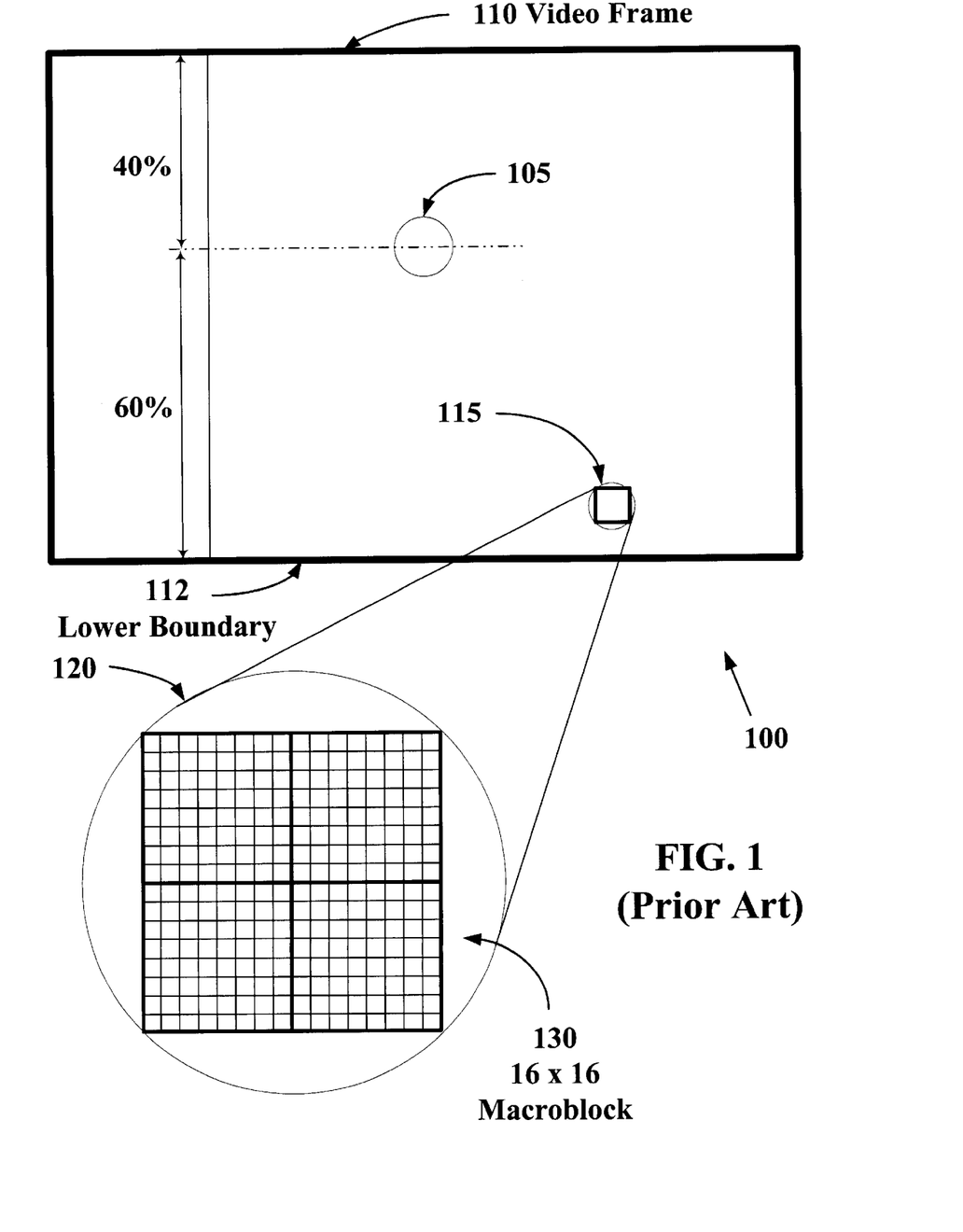
FIG. 1 shows an embodiment of a video frame with an exemplary expanded block and macroblock.

FIG. 1 illustrates a prior art video window 100, which may be a window on a computer screen, other display device, or a full or reduced screen image on a television. Video frame 110 shows an extent of a typical transmitted video image used in a video apparatus.

The video frame 110 comprises a plurality of macroblocks such as macroblock 115. An enlarged area 120 of the macroblock 115 shows a 16×16 pixel macroblock 130. Typically, each frame of a video image is partitioned into macroblocks. Conventionally, a CIF format includes 22×18 macroblocks or 396 total macroblocks for full CIF.

A central viewing area 105 is indicated within the video frame 110. The central viewing area 105 is frequently an area upon which a viewer's attention is most strongly focused. In one embodiment, the central viewing area 105 indicates a positional reference related to common framing of a single human face. A common framing technique in video imaging is to have a single person's head framed in the video window 100. Typically, such framing locates one of two human eyes in the central viewing area 105. The central viewing area 105 is located approximately in the center of the video frame 110 horizontally and at a vertical height that is close to 60% of the video frame 110 height as measured from a lower boundary 112 of the video frame 110. In the CIF format, the video frame 110 contains an array of 18 macroblocks in a vertical direction and 22 macroblocks in a horizontal direction.

Figure 2:
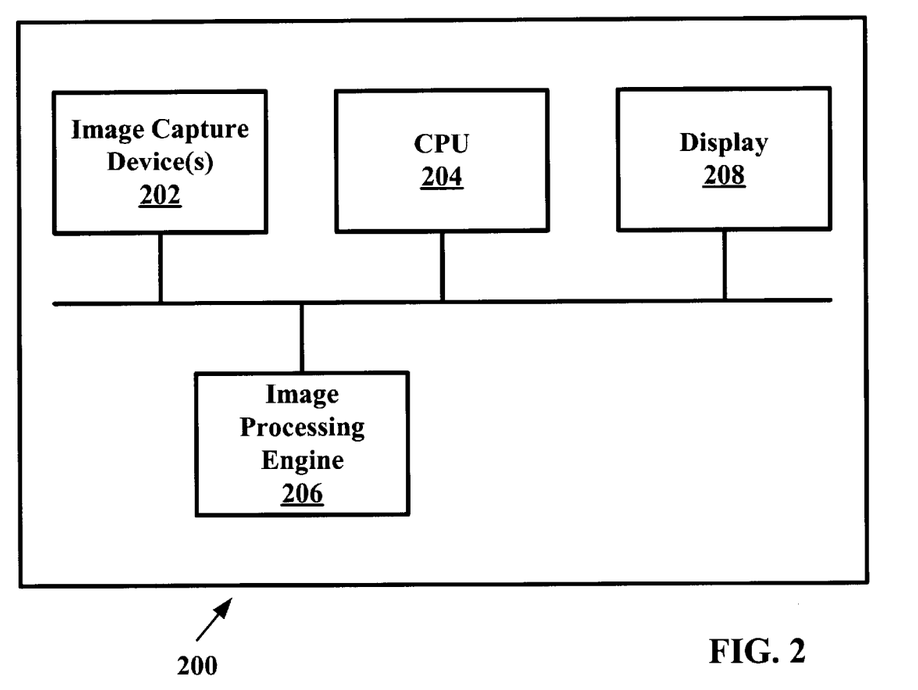
FIG. 2 shows an exemplary schematic of a video imaging system.

FIG. 2 shows a schematic embodiment of an exemplary video imaging system 200. The video imaging system 200 includes an image capture device 202, a central processing unit 204, an image processing engine 206, and either a local or remote display 208.

The image capture device 202 is used to capture video in a scene. At least one analog or digital video camera may be used as the image capture device 202. The central processing unit or CPU 204 coordinates all image capture devices 202 and digitizes the captured video. Further, the CPU 204 keeps track of all pixels in a given macroblock, sends each macroblock for compression coding to the image processing engine 206, and prepares the processed macroblocks for viewing on either the local or remote display 208. The image processing engine 206 is discussed in more detail in connection with FIG. 3.

In an alternative embodiment, the video imaging system 200 may be practiced using recorded images. The practice of using recorded images eliminates the need for the image capture device 202.

Figure 3:
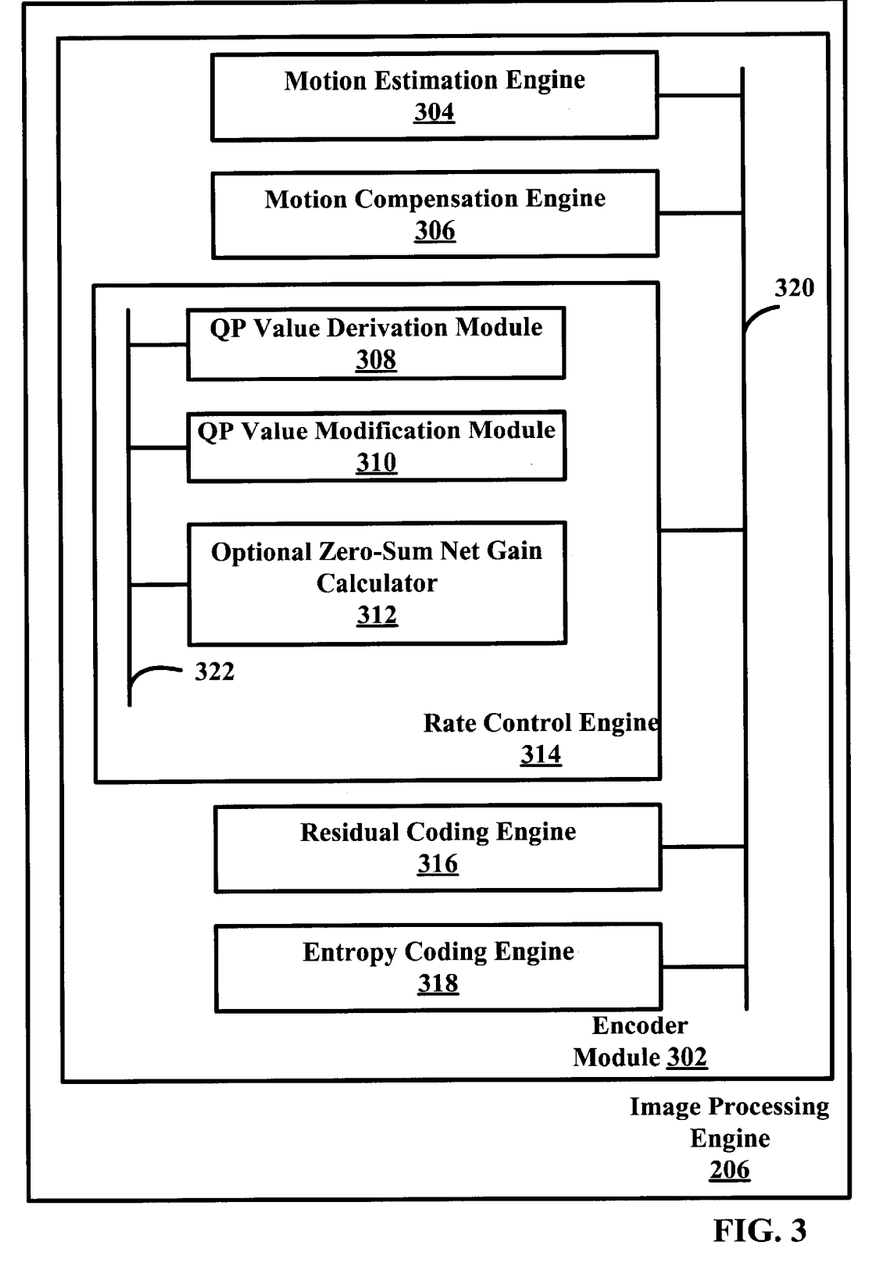
FIG. 3 shows an exemplary image processing engine.

FIG. 3 is a detailed embodiment of the exemplary image processing engine 206. The exemplary image processing engine 206 includes an encoder module 302. All components within the encoder module 302 are coupled via system buses 320, 322.

A motion estimation engine 304 identifies frame-to-frame redundancy in a video signal received from the image capture device 202. A prediction image is generated in a motion compensation engine 306 using parameters derived in the motion estimation engine 304. A rate control engine 314 generates a quantization parameter for each macroblock to control the average number of bits produced by the encoder each second. A residual coding engine 316 codes the difference between the motion compensated and the input images. An entropy coding engine 318 removes statistical redundancy from the data that is to be sent to a decoder. Further, the rate control engine 314 comprises two modules: a quantization parameter. (QP) derivation module 308 designed to produce quantization parameter values using traditional (e.g., square error) measures to achieve the desired encoding bit rate; and a quantization (QP) modification module 310 which changes the quantization parameter values derived in the quantization parameter derivation module 308 to achieve an image coding with higher perceived quality.

Additionally, the optional zero-sum net gain calculator 312 keeps track of whether a relative zero-sum net gain is maintained either within a given video frame (intra-frame) or over a plurality of frames (inter-frame). The latter inter-frame case is typically used when the intra-frame case does not yield a zero-sum net gain. A more detailed description of the rate control engine 314 and the optional zero-sum net gain calculator 312 is given infra.

Figure 4:
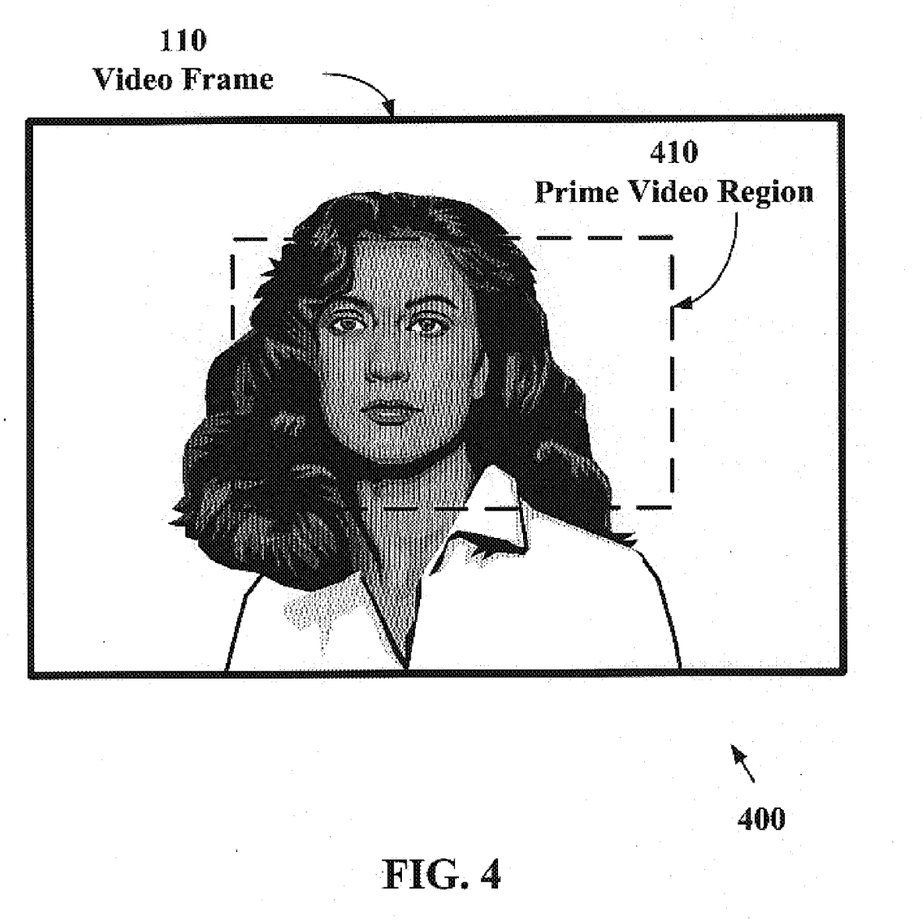
FIG. 4 shows a person framed in the prime video region of a video frame.

FIG. 4 shows an embodiment of a video window 400 in use. Contained within the video window 400 is an area referred to as a prime video region 410. The prime video region 410 is a region of the video window 400 on which a viewer of an image will typically focus his or her attention. (Consequently, central viewing area 105 (FIG. 1) is contained within prime video region 410 ). In a videoconferencing application, the prime video region 410 is also a region where an individual's head image will typically be located. Alternatively, prime video region 410 may be another important viewing region on which a viewer's attention will be focused. An example of another important image on which a viewer's attention may be focused is a person's hands while communicating with sign language, such as American Sign Language (ASL). Consequently, one embodiment of the present invention will increase a number of bits dedicated to encoding the prime video region 410 through use of the image processing engine 206 (FIG. 2), while other regions outside of the prime video region 410 may have a lower number of video data bits. Therefore, an overall bit allocation scheme will increase bit density in the prime video region 410 and minimize or decrease the number of video data bits outside of the prime video region 410.

In addition to the encoding algorithm normally optimizing for minimum mean square error, the encoding algorithm, in conjunction with the rate control engine 314, also optimizes for greatest perceptual quality under the assumption that the viewers attention will be on the prime video region 410. In one embodiment, a perceptual enhancement of a video frame 110 occurs with high quality coding of the regions that are expected to be important. Since more video data bits are now allocated to the prime video region 410, other areas must have a reduced bit density to maintain a constant overall bit usage. Preferably, the re-allocation of bit densities produces an overall zero-sum gain in a given frame.

Figure 5:
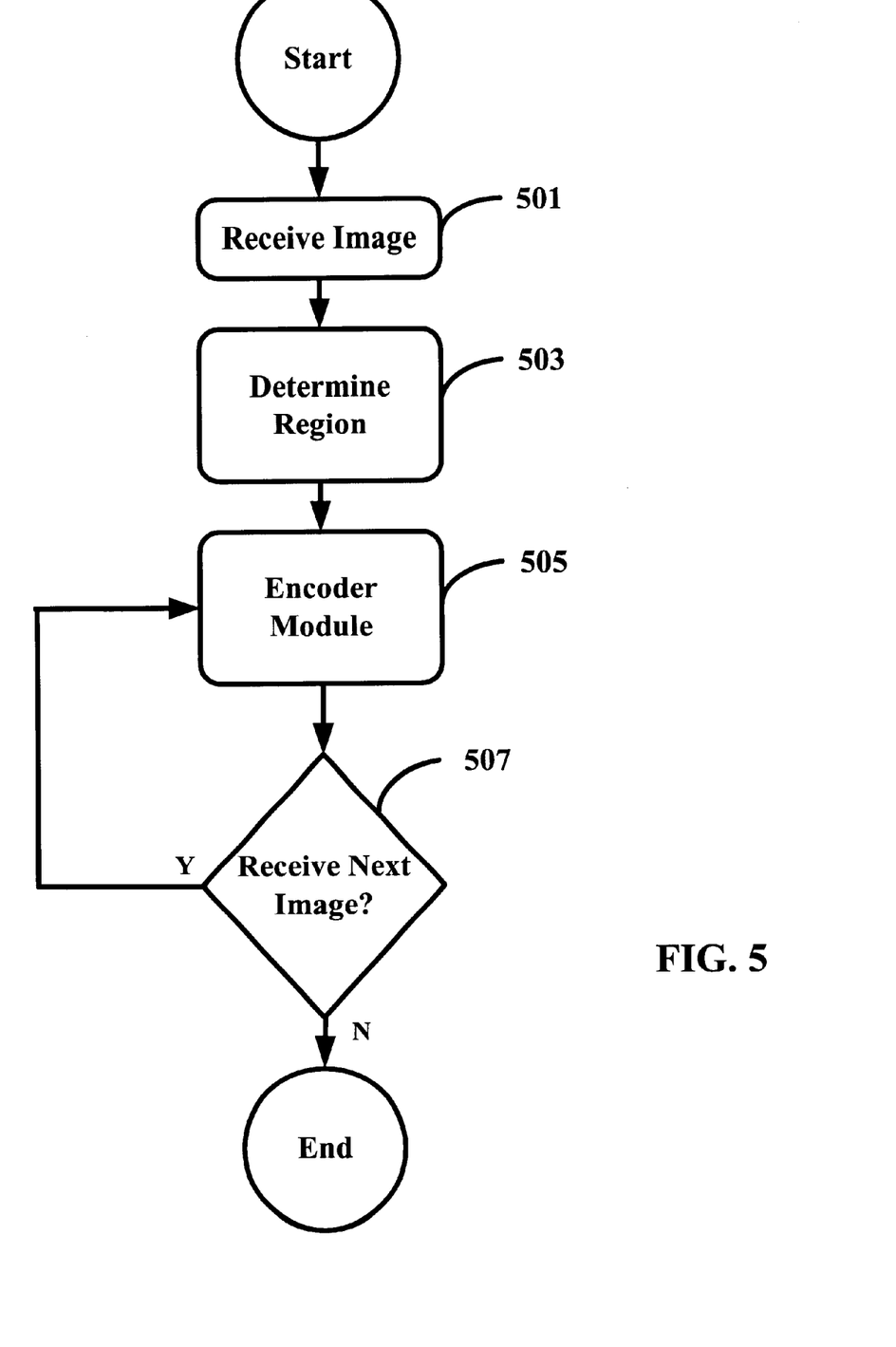
FIG. 5 shows an exemplary quantization parameter flowchart.

FIG. 5 shows an embodiment of one method for accomplishing the exemplary perceptual enhancement described above. First, an image is received 501 from the image capture device 202 (FIG. 2) and the prime video region and areas outside of the prime video region are identified 503. An encoder module 505 comprises a rate control algorithm and an encoding algorithm (not shown). The rate control algorithm determines the values of the quantization parameter for each macroblock and the image is processed by the encoding algorithm. For example, an H.263 encoder may be used to assign DCT coefficients to each macroblock received from the image capture device 202. Once the DCT coefficients have been established, a quantization parameter, one for each macroblock, will be applied to each DCT coefficient. The value of the quantization parameter that is applied to the DCT coefficients in a macroblock varies inversely with the required bit density. This means that a lower quantization parameter will yield a particular macroblock within a frame with higher quality and, thus, more video data bits. The prime video region 410 will be a region that requires a lower quantization parameter. Conversely, areas outside of the prime video region 410 will be assigned a high quantization parameter. A high quantization parameter will yield a commensurately lower video-quality macroblock but will require fewer video data bits. After the encoding process is complete a determination 507 is made as to whether another image has been received. If another image has been received, a loop is made back to the encoder module 505 to determine the quantization parameters for the new image, the method continues with subsequent steps as shown in FIG. 5.

Figure 6:
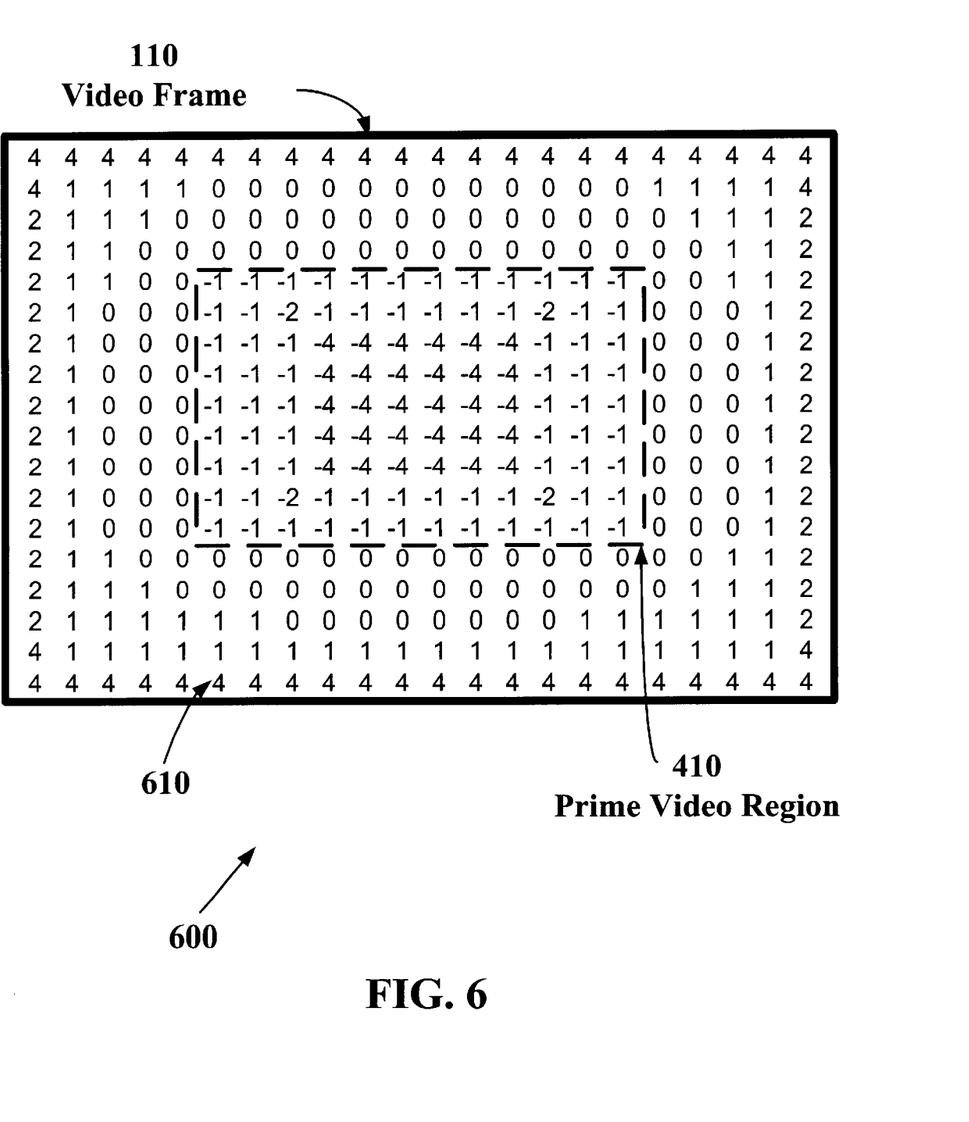
FIG. 6 shows an exemplary H.263 encoder based embodiment of quantization parameter modification values used to change quantization parameter values derived using traditional error measures.

FIG. 6 shows an exemplary set of quantization parameter modification values 600 contained within a standard FCIF window having 22×18 macroblocks. Each quantization parameter modification value 610 affects the quantization parameter for only one macroblock. Values of the quantization parameter modification values 610 become smaller (and increasingly negative) approaching a center of the prime video region 410 (FIG. 4). When summed with the quantization parameters produced in the quantization parameter value derivation module 308 (FIG. 3), the quantization parameter modification values 610 have the effect of reducing the net quantization parameter values approaching the center of the prime video region 410. This progressive reduction in quantization parameter values assures that the macroblocks which are most likely to be viewed in the video frame 110 (FIG. 1) will have the greatest number of bits. Values of a quantization parameter associated with macroblocks located along edges of the video frame 110 will usually be higher to provide a balance for the increased bit density at the prime video region 410. The perceived quality of the video frame 110 is not reduced significantly by the higher quantization parameter values since the least important information is frequently contained in the edge regions. If the modified quantization parameter falls outside the allowed range for quantization parameter values, it is assigned to the closest value that is in range. For H.263, the allowed quantization parameter range is 1 to 32. A quantization parameter modification value 610 of zero ("0 ") will not change the value of the quantization parameter derived by the by the quantization parameter value derivation module 308.

Preferably, a value of a quantization parameter does not change abruptly from one macroblock to an adjacent macroblock resulting in a noticeable sudden change in video quality.

In one embodiment, quantization parameter modification values are given a static assignment for a given location of a macroblock within the video frame 110. Therefore, once a quantization parameter modification value array is set, the array does not change to adapt to a new scene or any other variable.

In alternative embodiments, the quantization parameter modification values 610 may take on any real value. Specifically, a quantization parameter modification value 610 may be positive, negative, or zero. Also, the quantization parameter modification value 610 may be an integer or a fractional value. As an example, values in a quantization parameter modification value 610 array could take on values of −0.35, 2,−1, 4.3, and 0.

In yet further embodiments, a total number of bits per video frame may not exhibit a near zero-sum net gain. In this case, however, an inter-frame comparison will still exhibit either a total zero-sum net gain or close to a zero-sum net gain. For example, a first frame in a video image may have a quantization parameter gain of 126 quantization units (referring to a summation of all quantization parameters within a given frame). This quantization parameter gain will result in a coded video frame with fewer bits than an un-quantized video frame. The next frame or plurality of frames, however, may compensate by lowering their respective frame quantization units to account for the prior frame's net gain, resulting in an overall net-gain of zero. By employing this arrangement of allowing certain frames to have more bits than other previous or subsequent frames, there will be an apparent increase in overall video quality without a concomitant higher bandwidth requirement.

From the description of the exemplary embodiments of the apparatus and process set forth herein, it will be apparent to one of ordinary skill in the art that variations and additions to the embodiments can be made without departing from the principles of the present invention. For example, a method whereby an entire three-dimensional (3D) volume could be transmitted and displayed in a video conferencing system as opposed to a two-dimensional area may be contemplated. This may be accomplished by holography or some other means. In this case, the quantization parameter modification values 610 would be in the form of a three-dimensional array. Additionally, similar perceptual coding techniques may be applied by using quantization parameter modification values 610 on unit cells other than macroblocks. The quantization parameter modification values 610 could be applied, for example, to blocks of varying pixel sizes or individual pixels. Additionally, perceptual coding techniques may readily be applied when there is a plurality of prime video regions. Therefore, these and other variations upon the specific embodiments are intended to be covered by the present invention.

What is claimed is:

1. A system for static perceptual coding of a plurality of elements of a video frame comprising:
   a processor;
   at least one image capture device coupled to the processor for capturing video of an image;
   an image processing engine coupled to the processor for quantizing the plurality of elements of the video frame;
   a template which defines at least one static prime region and at least one static secondary region; and
   a quantization parameter produced by the image processing engine derived from the template for each of the plurality of elements, the quantization parameter being capable of producing a variable bit density for perceptual video quality improvement over the video frame, wherein the bit density within the prime region is higher than the bit density within the secondary region.

2. The system of claim 1, wherein the plurality of elements are macroblocks.

3. The system of claim 1, wherein the plurality of elements are 8×8 arrays of pixels.

4. The system of claim 1, wherein the plurality of elements are pixels.

5. The system of claim 1, wherein the template is user defined.

6. The system of claim 1, wherein a modification of the bit density within the prime region and a modification of the bit density within the secondary region are combinable in such a way so as to produce a near zero net-gain in bit-density.

7. The system of claim 1, wherein the plurality of variable bit-density video frames within the videoconferencing transmission has an overall near zero-sum net gain in pixel density.

8. The system of claim 1, further comprising a plurality of variable bit-density video frames within a videoconferencing transmission, wherein a subsequently transmitted variable bit-density frame may not be equal to a previously transmitted variable hit-density frame in total bit-density.

9. The system of claim 1, wherein the image processing engine comprises an encoder module.

10. The system of claim 1, wherein the image processing engine comprises a quantization module.

11. The system of claim 1, wherein the image processing engine comprises a zero-sum net gain calculator.

12. The system of claim 1, wherein the quantization parameter changes gradually in numeric magnitude from one of the plurality of elements to the next.

13. The system of claim 1, wherein a value of the quantization parameter is any real number.

14. A system for static perceptual coding of a plurality of elements of a video frame comprising:
   an image processing engine for quantizing the plurality of elements of the video frame; and
   a template which defines at least one static prime region and at least one static secondary region; and
   a quantization parameter produced by the image processing engine derived from the template for each of the plurality of elements, the quantization parameter being capable of producing a variable bit density for perceptual video quality improvement over the video frame wherein the bit density within the prime region is higher than the bit density within the secondary region.

15. The system of claim 14, wherein the plurality of elements are macroblocks.

16. The system of claim 14, wherein the plurality of elements are 8×8 arrays of pixels.

17. The system of claim 14, wherein the plurality of elements are pixels.

18. The system in claim 14,
   wherein the prime region is at the center of the video frame; and
   wherein the secondary region is the region outside the prime region of the video frame.

19. The system in claim 18,
   wherein the quantization parameters of elements within the prime region is uniform; and
   wherein the quantization parameters of elements within the secondary region increase gradually from the boundary of the prime region outwards the edges of the video frame.

20. The system in claim 14, wherein the prime region is located at other than the center of the video frame, wherein the secondary region is the region outside the prime region of the video frame.

21. A method for enhancement of a video frame comprising:
   receiving an image;
   applying an encoder algorithm to each element of the received image;
   determining a region in which each element belongs spatially according to a template which defines at least one static prime region and at least one static secondary region; and
   assigning a quantization parameter to each element to vary a bit-density of the element to perceptually improve video quality, such that the bit density within the prime region is higher than the secondary region.

22. The method of claim 21, wherein the element is a macroblock.

23. The method of claim 21, wherein the element is an 8×8 array of pixels.

24. The method of claim 21, wherein the element is a pixel.

25. A computer-readable medium for enhancement of a video frame comprising a computer program operable to carryout the method as in claim 21.

26. A system for enhancement of a video frame comprising:

a means for receiving an image;

a means for applying an encoder algorithm to each element of the received image;

a means for determining a region in which each element belongs spatially according to a template which defines at least one static prime region and at least one static secondary region; and a means for assigning a quantization parameter to each element to vary a bit-density of the element to perceptually improve video quality such that the bit density within the prime region is higher than the secondary region.

* * * * *